(12) United States Patent
Deutschmann et al.

(10) Patent No.: US 9,531,710 B2
(45) Date of Patent: Dec. 27, 2016

(54) BEHAVIORAL AUTHENTICATION SYSTEM USING A BIOMETRIC FINGERPRINT SENSOR AND USER BEHAVIOR FOR AUTHENTICATION

(71) Applicant: Behaviometrics AB, Lulea (SE)

(72) Inventors: Ingo Deutschmann, Merseburg (DE); Neil Costigan, Lulea (SE); Tony Libell, Lulea (SE); Peder Nordström, Lulea (SE)

(73) Assignee: BEHAVIOMETRICS AB, Lulea (SE)

( * ) Notice: Subject to any disclaimer, the term of this patent is extended or adjusted under 35 U.S.C. 154(b) by 24 days.

(21) Appl. No.: 14/705,321

(22) Filed: May 6, 2015

(65) Prior Publication Data
US 2015/0358317 A1    Dec. 10, 2015

Related U.S. Application Data

(60) Provisional application No. 61/990,732, filed on May 9, 2014.

(51) Int. Cl.
*G06F 21/30* (2013.01)
*H04L 29/06* (2006.01)
*H04W 12/06* (2009.01)

(52) U.S. Cl.
CPC ....... *H04L 63/0861* (2013.01); *H04L 63/0884* (2013.01); *H04W 12/06* (2013.01)

(58) Field of Classification Search
USPC .............. 713/186; 726/4, 6, 19, 27; 382/124
See application file for complete search history.

(56) References Cited

U.S. PATENT DOCUMENTS

| | | | |
|---|---|---|---|
| 7,908,216 B1 * | 3/2011 | Davis ..................... | G06Q 20/02 705/41 |
| 2003/0088645 A1 * | 5/2003 | Ferraro .................. | G06Q 10/10 709/218 |
| 2003/0123714 A1 * | 7/2003 | O'Gorman ......... | G06K 9/00899 382/124 |
| 2003/0179912 A1 * | 9/2003 | Murase .............. | G06K 9/00154 382/119 |
| 2004/0131237 A1 * | 7/2004 | Machida ............ | G06K 9/00899 382/124 |
| 2008/0091453 A1 * | 4/2008 | Meehan ............... | G06Q 20/341 705/317 |
| 2008/0129704 A1 * | 6/2008 | Pryor ..................... | G06F 3/011 345/173 |
| 2009/0278792 A1 * | 11/2009 | Toebes .................. | G06F 21/32 345/156 |

(Continued)

*Primary Examiner* — Sayed Beheshti Shirazi
(74) *Attorney, Agent, or Firm* — Michael J. Feigin, Esq.; Feigin & Fridman (57) ABSTRACT

A method and a corresponding device for authenticating a user for access to protected information, including at a registration stage, generating a biometric user profile and a behavioral user profile associated with a user to be authenticated, and an authenticating stage, obtaining from the user a biometric user sample and a behavioral user sample, comparing the biometric user sample and the behavioral user sample to the biometric user profile and to the biometric behavioral profile associated with the user, and if the biometric user sample and the behavioral user sample match the biometric user profile and the biometric behavioral profile, respectively, enabling the user to access the protected information.

7 Claims, 5 Drawing Sheets

(56) References Cited

U.S. PATENT DOCUMENTS

| | | | | |
|---|---|---|---|---|
| 2010/0115610 | A1* | 5/2010 | Tredoux | H04L 9/3231 726/19 |
| 2010/0272609 | A1* | 10/2010 | Haas | G01N 21/8483 422/82.05 |
| 2011/0304531 | A1* | 12/2011 | Brooks | G06F 1/1626 345/156 |
| 2012/0246737 | A1* | 9/2012 | Paxton | G06F 21/316 726/27 |
| 2012/0266220 | A1* | 10/2012 | Brudnicki | G06F 21/629 726/6 |
| 2013/0076650 | A1* | 3/2013 | Vik | G06F 3/041 345/173 |
| 2013/0282637 | A1* | 10/2013 | Costigan | G06N 5/022 706/46 |
| 2013/0288647 | A1* | 10/2013 | Turgeman | H04W 12/06 455/411 |
| 2014/0247251 | A1* | 9/2014 | Zhang | G06F 3/0488 345/178 |
| 2014/0297528 | A1* | 10/2014 | Agrawal | G06F 21/32 705/44 |
| 2016/0197918 | A1* | 7/2016 | Turgeman | G06F 3/0481 726/4 |

\* cited by examiner

BEHAVIORAL AUTHENTICATION SYSTEM USING A BIOMETRIC FINGERPRINT SENSOR AND USER BEHAVIOR FOR AUTHENTICATION

FIELD OF THE DISCLOSED TECHNOLOGY

The disclosed invention relates generally to an authentication system, to an authentication method and to an authentication software program. More particularly the disclosed invention relates to a system, a method and a software program for authenticating users based on their fingerprints and their behavior.

BACKGROUND OF THE DISCLOSED TECHNOLOGY

Desktop computers, mobile devices and tablet computers have no built-in security mechanisms for user authentication with web services and applications, other than the traditional Personal Identification Number (PIN) or use of additional devices like smart cards or One-Time Password (OTP) tokens. However, web services and applications for banking access rely on a strong user authentication to protect customer data and funds against unauthorized access. For authentication of users to be non-annoying and not disrupting, a behavioral authentication which is transparent to the user is seen as a favorite method. Additionally, biometric methods are being used more frequently on mobile devices and desktop computers.

There are several patent applications and issued patents in the field of user authentication which use biometric methods to identify users on mobile devices. In U.S. Patent Publication No. 2010/0225443, a system is described for user authentication using touch sensitive elements and/or using a signature of the user. In U.S. Patent Publication No. 2011/0126024, a method and system are described for combining a PIN and a biometric sample. In PCT/US2013/041868 a fingerprint sensor is used to navigate through Graphical User Interface (GUI) and applications.

Fingerprint sensors are being used for authentication of users using mobile devices and desktop computers. The problem with fingerprint technology is that it can be spoofed by using forged fingerprints or rubber finger coverings. Although there are existing fingerprint systems, which use liveliness detections and other enhancements, these tend to be expensive and are not easily integrated into mobile phones, because of the small form factor. Thus there is need for a simple, low cost, and small fingerprint system.

Furthermore voice and visual biometrics has been used to authenticate users on desktop and mobile devices. Voice and visual biometrics also tend to be prone to spoofing by using photographs and voice recordings.

SUMMARY OF THE DISCLOSED TECHNOLOGY

Therefore, it is an object of the disclosed invention to provide a device and a method for authenticating a user for access to protected information using biometric and behavioral input data obtained from the user. In some embodiments, the input data is obtained by monitoring and gathering biometric and behavioral input data of a one or more users, storing the biometric and behavioral input data of the users, and, during a future use of the device, comparing data samples to the stored biometric and behavioral input data in order to determine security clearance to the protected information.

The inventive biometric authentication system disclosed comprises a client computer, which might be a traditional desktop computer or a mobile computing device, such as a laptop computer, a tablet computer, or a smart mobile phone, the client computer including sensors for gathering biometric and behavioral data, and in some embodiments also includes a touch pad.

The sensors might include one or more of at least one fingerprint sensor or scanner, a microphone, one or more camera or image sensors, a gyroscope, and an accelerometer. In some embodiments, a touch pad device may be used, for example for collecting behavioral input.

As behavioral methods are intended to discriminate users based on their behavior, such methods may be used for authenticating users in addition to using biometric information, such as fingerprints, voice samples, and pictures of the user, bringing together biometric and behavioral authentication and enhancing the quality of authentication systems.

In some embodiments, the authentication system might be realized on the client computer, or might be partially distributed with a central service accessible via network links.

In some embodiments, the disclosed biometric authentication process includes a first enrollment phase and a second authentication phase. In the enrollment phase, a biometric sample of the user is gathered on the client computer, and the sample is transferred to the authentication system which then generates a biometric profile of the user, and stores the biometric profile in a database. In some embodiments, in addition to the biometric sample, also a behavioral sample of the user is gathered on the client computer, is transferred to the authentication system for generation of a behavioral profile, and stored in the database together with the biometric profile.

In some embodiments, the authentication system and the database reside on the client computer.

In some embodiments, the authentication system and the database are accessible from the client computer via a networked service, such as an internet service.

In the later authentication phase, a biometric information sample and a behavioral sample of the user, which are gathered on the client computer, are sent to the authentication system. The authentication system compares the received biometric information and behavioral samples to the biometric and behavioral profiles associated with the user. If the sample of the user is similar or identical to the biometric and the behavioral profile associated with the user and stored in the database, the user is granted access to the protected application and/or to the protected resource. The protected resource might be a private key stored on the client computer and/or might be a protected service, for example located on the client computer and/or located remotely and available to the client computer via a network link.

In further embodiments of the disclosed technology, a tap based secure-resource unlocking mechanism is realized using a fingerprint sensor or scanner, where the user taps, or swipes, his finger on the fingerprint sensor as for a normal scan, but a plurality of times, such that the fingerprint sensor, or a processor associated therewith, can carry out behavioural analysis on each tap or swipe. Thus data, such as whether or not the sensor is pressed, the duration of a press, the direction of the swipe, and the like are available as behavioural data to augment the unlocking process. This leads to better accuracy, and provides data which is difficult to spoof, for example with a fake fingerprint.

In some embodiments of the disclosed technology, a method is used for authenticating a user using a computing device for access to protected information. The method comprises, not necessarily in the following order:
a) acquiring biometric input data from the user, for example via a biometric input device;
b) while the user uses the computing device, gathering behavioral input data from at least one behavioral input device associated with the computing device;
c) storing at least a version of at least a portion of the acquired biometric input data together with at least a version of at least a portion of the gathered behavioral input data on a computer readable medium in a machine readable user profile;
d) in an authentication stage, retrieving the biometric and behavioral input data from the user profile;
e) comparing a biometric data sample and a behavioral input data sample obtained during a current session of use of the computing device to biometric and behavioral input data from the user profile; and
f) generating a response based on results of the comparison, wherein the response is an authentication of the user when the biometric data and behavioral input data of the current session match the user profile, or a rejection of privileged access sought by the user when no match is found.

In some embodiments, the biometric data and the behavioral input data may be encrypted prior to being stored on the computer readable medium. In some embodiments, usage of the computing device by the user is continuously monitored for patterns that are indicative of fraud being perpetrated on the computing device. In some embodiments, the behavioral data is gathered using behavior monitoring software installed on the computing device.

In another embodiment of the disclosed technology, there is provided a method for confirming that a present user of a computing device is authorized to use the device. The method comprises, not necessarily in the following order, by:
a) gathering biometric data regarding the user via a biometric input device, and gathering behavioral data regarding the user via a behavior monitor, which records actions taken by the user with respect to components of the computing device;
b) comparing biometric data and behavioral input data gathered during a current use of the computing device to such data collected during a prior use of the computing device, thereby to determine if the data of the current use matches the data of the prior use; and
c) generating a response based on the comparison, wherein when the data of the current use does not match the data of the prior use, the response is logout or a request to re-authenticate the user of the computing device.

In further embodiments, the response based on the comparison may be used to unlock a private key of the user, which might be located on the computing device or may be stored at a central behavioral server. The private key may then be used to authenticate the user to third party applications or web services, which might reside on the computing device or may be accessible via network links. The authentication information may grant access to a feature of the third party application on the computing device and/or to web services.

In yet another embodiment of the disclosed technology, there is provided a method for detecting whether a current user is or is not the same as an intended user of a computing device. The method comprises, not necessarily in the following order:
a) gathering biometric data and behavioral input data relating to the current user's interactions with the computing device, wherein the interactions comprise at least one of a location of interaction as determined by a positioning device, orientation and/or movement of the computing device as determined by an accelerometer and/or a gyroscope, and tactile interaction with the device as determined by a touch screen of the computing device;
b) transmitting the gathered biometric data and behavioral input data to a network node;
c) retrieving, at the network node, profile data pertaining to an intended user of the computing device;
d) comparing the biometric and behavioral data transmitted to the network node with the profile data to determine whether the current user's biometric and behavioral data match those of the intended user of the computing device as defined in the profile data;
e) at the network node, generating a security classification based on the results of the comparison; and
f) sending the security classification from the network node to the computing device, such that the security classification dictates accessibility of the current user to certain features on the computing device.

In yet another embodiment of the disclosed technology, there is provided a method for detecting whether a current user is or is not the same as an intended user of a computing device. The method comprises, not necessarily in the following order:
a) gathering biometric data and behavioral input data relating to the current user's interactions with the computing device, wherein the interactions comprise at least one of a location of interaction as determined by a positioning device, orientation and/or movement of the computing device as determined by an accelerometer and/or a gyroscope, and tactile interaction with the device as determined by a touch screen of the computing device;
b) retrieving profile data pertaining to the intended user of the mobile device, which profile data is stored on the computing device;
c) comparing the gathered biometric data and behavioral input data to the retrieved profile data to determine whether the current user's biometric and behavioral data match those of the intended user of the computing device as defined in the profile data;
d) generating a security classification based on the comparison; and
e) using the security classification on the computing device, such that the security classification dictates accessibility to certain features on the computing device.

In some embodiments, the security classification may be used to unlock a private key, which private key may be used to authenticate the user against third party software on the computing device as well as against web services which might reside on the computing device or are accessible via network links.

In yet another embodiment of the disclosed technology, there is provided a method for detecting whether a current user is or is not the same as an intended user of a computing device. The method comprises, not necessarily in the following order:
a) gathering biometric and behavioral input data relating to the current user's interactions with the computing device, wherein the behavioral data is gathered from a swipe fingerprint sensor, by:
  acquiring from the fingerprint sensor a full image of the user's fingerprint during a swipe of the finger over the sensor;

retrieving at least one additional, at least partial image of the user's fingerprints from the fingerprint sensor during the swipe of the finger;

comparing the at least one additional image to the full image and determining the direction in which the finger of the user was swiped over the fingerprint sensor;

determining the center of gravity of the fingerprint swipe;

determining the position of the fingerprint swipe relative to the fingerprint sensor; and determining the pressure applied by the finger during the fingerprint swipe; and b) based on the gathered biometric and behavioral input data, building a behavioral profile of the user when using the fingerprint sensor.

In yet another embodiment of the disclosed technology, there is provided a method for detecting whether a current user is or is not the same as an intended user of a computing device. The method comprises, not necessarily in the following order:

a) gathering biometric and behavioral input data relating to the current user's interactions with the computing device, wherein the behavioral data is gathered from at least one fingerprint sensor, by:

acquiring from a swipe fingerprint sensor a first image of the user's fingerprint during a swipe of the finger over the swipe fingerprint sensor;

retrieving from an area fingerprint sensor at least one further image of the user's fingerprint;

comparing the orientation of the at least one further image from the area fingerprint sensor and of the first image from the swipe fingerprint sensor to determine the direction in which the finger of the user was moved;

determining a center of gravity of said at least one further image;

determining a position of said fingerprint in said further fingerprint images relative to the position of said fingerprint in said first image; and determining a pressure applied by the user to the area fingerprint sensor by comparing ridges of the fingerprint in the first fingerprint image with ridges of the fingerprint in the at least one further fingerprint image; and b) using the gathered behavioral input data, building a behavioral profile of the user when using the area fingerprint sensor.

In yet another embodiment of the disclosed technology, there is provided a method for detecting whether a current user is or is not the same as an intended user of a computing device. The method comprises gathering biometric and behavioral input data relating to the current user's interactions with the computing device, wherein the behavioral data is gathered from an area fingerprint sensor, by collecting information regarding a direction in which and a speed at which the user is swiping over the fingerprint sensor, as well as information regarding the pressure applied by the user's finger to the fingerprint sensor, and using the collected information to build a behavioral profile of the user when using the area fingerprint sensor.

In some embodiments, the method may further include comparing the current user's interactions with the fingerprint sensor to the behavioral profile of the user.

In some embodiments, of the method may further include:

based on the comparison, providing a response used to unlock a private key of the user; and using the private key, authenticating the user to third party applications or web services, which might reside on the client computer or are accessible via network links.

In some embodiments, the method may further include:

based on the comparison, generating a security classification; and providing the security classification to the computing device, such that the security classification dictates accessibility to certain features on the computing device.

In some embodiments, the comparison of the user biometric and behavioral data is carried out by a central service or server. In such embodiments, the biometric and behavioral data may be encrypted before transmitting the data to or receiving the data from the central service or server. That is, the data sent may be of a sensitive nature, and thus the data should be secured in the event that the data transmission is intercepted or the data is subject to online fraud, phishing, or other data theft.

In some embodiments, the security classification may be correlated to a degree or an extent to which the biometric and behavioral data match the profile data. Thus, the closer the match, the higher the generated security classification, and the higher the security clearance received by the user. Still further, the security classification may be digitally signed at the network node.

In some embodiments, the step of gathering behavioral data may be carried out using a behavior monitor installed onto the computing device. Alternatively, the behavior monitor may be incorporated into an operating system of the computing device.

A "behavior monitor," for purposes of this specification, is defined as any sequence of steps or algorithm stored on a non-transitory storage medium and carried out by a processor of a computing device. The behavior monitor may be a software program installed or written onto the storage of the computing device. The behavior monitor may run as a background process on the computing device. A user may or may not be aware of the behavior monitor's presence and/or activity on the computing device. Alternatively, the behavior monitor may be stored remotely, at a remote network node or remote server that is accessible to the computing device via a network connection.

In some embodiments, the step of gathering behavioral data may be carried out after enrollment with a fingerprint sensor, in that at first only the authentication of the user with the fingerprint is used, and after acquiring enough information in the behavioral profile, the current behavior of the user is compared with the generated user profile.

In yet another embodiment of the disclosed technology, there is provided a method for detecting whether a current user is or is not the same as an intended user of a computing device, the method comprising:

a) gathering biometric and behavioral input data relating to a current user's interactions with the computing device, wherein the behavioral data is gathered from an image sensor such as a camera, by:

acquiring a first image of the current user from the image sensor;

obtaining additional images of the current user from the image sensor; and comparing the additional images with the first image; and b) using the obtained images and the comparison, building a behavioral profile of the user while using the image sensor.

In some embodiments, the method further comprises:

comparing the current user's interactions to the behavioral profile of the user while using the image sensor to determine whether the two match;

generating a response based on the comparison, wherein the response is used to unlock a private key of the user; and using the private key to authenticate the user to third party applications or web services, which might reside on the client computer or are accessible via network links.

In some embodiments, the method further comprises:

generating a security classification based on the comparison; and providing the security classification to the computing device, such that the security classification dictates accessibility to certain features on the computing device.

In some embodiments, the comparison of the user biometric and behavioral data is carried out by a central service or server. In such embodiments, the biometric and behavioral data may be encrypted before the transmitting the data to or receiving the data from the central service or server. That is, the data sent may be of a sensitive nature, and thus the data should be secured in the event that the data transmission is intercepted or the data is subject to online fraud, phishing, or other data theft.

In some embodiments, the security classification may be correlated to a degree or an extent to which the biometric and behavioral data match the profile data. Thus, the closer the match, the higher the generated security classification, and the higher the security clearance that will be received. Still further, the security classification may be digitally signed at the network node.

In yet another embodiment of the disclosed technology, there is provided a method for detecting whether a current user is or is not the same as an intended user of a computing device, the method comprising:

a) gathering biometric and behavioral input data relating to the current user's interactions with the computing device, wherein the behavioral data is gathered from a voice sensor such as a microphone, by:

acquiring a first voice recording sample of the user from the voice sensor;

retrieving at least one additional voice recording sample from the user from the voice sensor; and comparing the at least one additional voice recording sample from the voice sensor with the first voice recording sample from said voice sensor; and b) using said first voice recording sample, said at least one additional voice recording sample, and said comparison, building a behavioral profile of the user while using the voice sensor.

In some embodiments, the method further comprises:

comparing the current users interactions to the behavioral profile of the user while using the voice sensor to determine whether the two match;

generating a response based on the comparison, wherein the response is used to unlock a private key of the user; and using the private key to authenticate the user to third party applications or web services, which might reside on the client computer or are accessible via network links.

In some embodiments, the method further comprises:

generating a security classification based on the comparison; and providing the security classification to the computing device, such that the security classification dictates accessibility to certain features on the computing device.

In some embodiments, the comparison of the user biometric and behavioral data is carried out by a central service or server. In such embodiments, the biometric and behavioral data may be encrypted before transmitting the data to and receiving the data from the central service or server. That is, the data sent may be of a sensitive nature, and thus the data should be secured in the event that the data transmission is intercepted or the data is subject to online fraud, phishing, or other data theft.

In some embodiments, the security classification may be correlated to a degree or an extent to which the biometric and behavioral data match the profile data. Thus, the closer the match, the higher the generated security classification, and the higher the security clearance that will be received. Still further, the security classification may be signed at the network node.

"Biometric input data," for purposes of this specification, is defined as biometric data observed and/or recorded from the user's interaction with user input component(s) of one or more computing devices. Such data may include fingerprint data, video data and/or speech data. The fingerprint data might be gathered from any fingerprint sensor, which is included in or is attached to the computing device. If the computing device includes a touch pad supporting fingerprint capture, the touch pad may also be used to capture the biometric data. Voice biometric data may be captured using a voice sensor or voice recording device such as a microphone, which may accessible from the computing device. Video or picture biometric data may be captured using an image sensor such as a camera, which may be accessible from the computing device.

"Behavioral input data," for purposes of this specification, is defined as data observed and/or recorded during user interaction with user input component(s) of one or more computing devices. Such data may include the manner in which the user holds and orients a mobile computing device. The data may further include electronic input observations such as keystroke patterns and style, use of particular applications, and touches on the touchpad and time stamps thereof. The data may further include the time of day at which the computing device is used, a location at which the computing device is used as determined by a positioning system such as a Global Positioning System (GPS), an Internet Protocol (IP) address of the device, a network status of the device, visibility of wireless local area networks (WLAN/Wi-Fi) in the vicinity of the device, gyroscopic measurements of a mobile device when held by the user, accelerometer measurements of a mobile device when held by the user, gestures drawn on a touch pad of the device, pressure applied to the touch pad of the device, electrical current drawn by the fingerprint sensor, directions in which the finger of the user was swiped over the fingerprint sensor, characteristics of the user tapping on the fingerprint sensor, pressure applied by the finger to the fingerprint sensor when the fingerprint is acquired, and/or the center of pressure of the fingerprint, when the fingerprint was acquired.

A "current session," for purposes of this specification, is defined as an interval of use of the computing device by a single user. The start of a session may be when the computing device is activated or switched on. The end of a session may be when the user logs out from the computing device or by timeouts triggered by the computing device.

It should be understood that the use of "and/or" is defined inclusively such that the term "a and/or b" should be read to include the sets: "a and b," "a or b," "a," "b." Further details are set forth in the detailed description below.

A better understanding of the disclosed technology will be obtained from the following detailed description of the preferred embodiments taken in conjunction with the drawings and the attached claims.

DETAILED DESCRIPTION OF EMBODIMENTS OF THE DISCLOSED TECHNOLOGY

Embodiments of the disclosed invention are directed to methods and/or systems for using biometric and behavioral authentication for identifying one or more specific users using computing devices as intended users, thereby tying the computing devices to the users. The methods and/or systems may employ a fingerprint sensor, a behavior monitor or behavior capturing software, secure communication, and/or a biometric/behavioral server to authenticate users. The biometric monitor and behavior monitor or behavior capturing software may gather and/or interpret biometric and behavioral information. The biometric/behavioral server may be used to compare the captured information to stored user profiles and to generate authentication information based on the comparison. The authentication information may be used to unlock a private key which may be used to authenticate the user of the computing devices.

In some embodiments, the biometric/behavioral server may unlock a private key which may be used to authenticate the user of the computing devices.

Embodiments of the disclosed invention will become clearer in view of the following description of the Figures.

Figure 1:
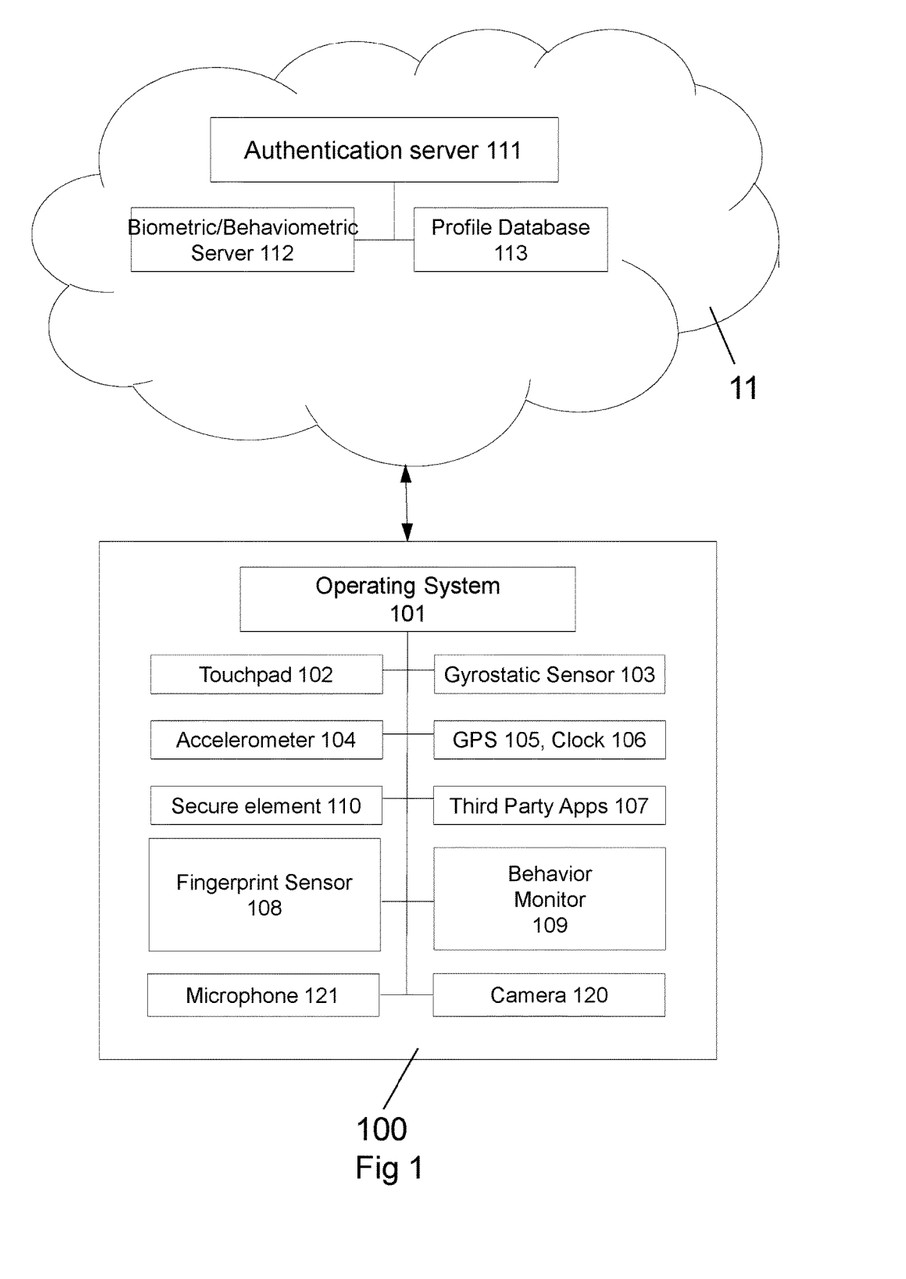
FIG. 1 shows a schematic overview of an exemplary system of an embodiment of the disclosed technology including a central biometric/behavioral server as well as an authentication server.
Figure 2:
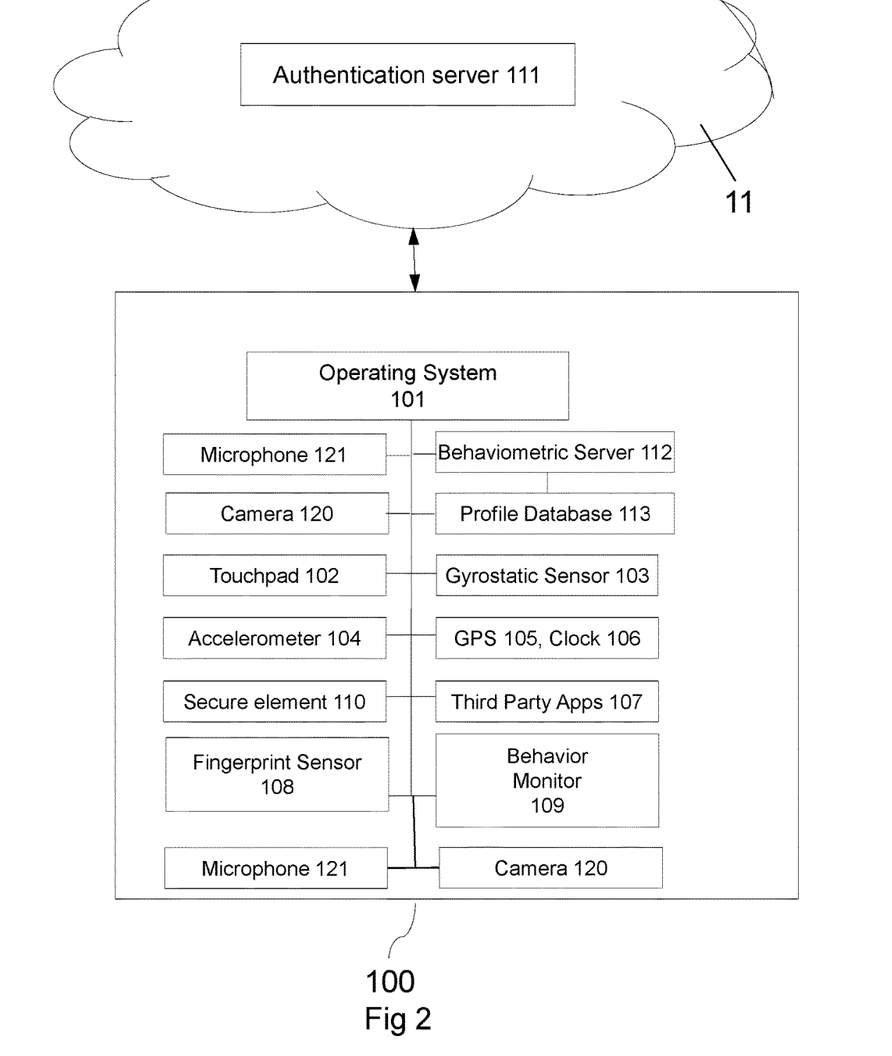
FIG. 2 shows a schematic overview of an exemplary system of an embodiment of the disclosed technology using only an authentication server.

FIG. 1 shows a schematic overview of an exemplary system of an embodiment of the disclosed technology including a central biometric/behavioral server as well as an authentication server. FIG. 2 shows a schematic overview of an exemplary system of an embodiment of the disclosed technology using only an authentication server. The system is used to identify specific users intended to use a specific computing device. The system includes a computing device 100, having connection to at least one wireless packet-switched network 11, as well as one or more sensors as described hereinbelow. The computing device 100 may be a mobile computing device, defined as any portable electronic device with a processor that carries out instructions, and having at least one wireless packet-switched network connection, an input for user interaction, and a visible display with which a user may interact. Examples of mobile devices 100 may be, but are not limited to, mobile phones, tablets, personal digital assistants (PDAs), laptops, netbooks, smart watches, e-readers, and/or digital cameras. The computing device 100 may be a desktop computer, defined as any traditional stationary or portable electronic device with a processor that carries out instructions, and having at least a network connection, an input for user interaction, and a visible display with which a user may interact.

The system ties a user to a specific device 100 by binding user authentication to the device 100. Biometric and Behavioral input data of a user is gathered while the user is using the device 100. The data may be used to decrypt a private key located in a secure element 110, which secure element is associated with the device 100. The private key can then be used to sign transactions for authentication purposes.

Referring still to FIG. 1, the components of a mobile device 100 are shown. All of the components of the mobile device 100 are tied to an operating system 101, which is defined as coded instructions configured to instruct a hardware device to carry out mathematical operations or electrical interactions with physical components electrically or wirelessly connected to one another, as well as user interaction therewith. Examples of operating systems may include iOS, Android, BlackBerry OS and Microsoft operating systems.

Physical components of device 100 include one or more of a touchpad 102, a gyrostatic sensor 103, an accelerometer 104, a GPS 105, a fingerprint sensor 108, a microphone 121, and a camera 120. Each of these physical components may typically already be found in most mobile computing devices 100.

When employed by the present invention, the physical components are used to detect and monitor movements or activities carried out by the user with respect to the device 100. Such movements may include, for example, an orientation and/or angle at which a user holds a mobile device 100 during operation thereof. For example, a particular user may typically hold the mobile device 100 at a horizontal, landscape orientation, with the display tilted at a 45 degree angle with respect to the ground. Such behavior, if consistently exhibited, may be stored and associated with a user profile pertaining to the particular user. As such, when similar behavior is recognized, the system will associate a present user of the device with the recognized behavioral pattern, and thus grant security clearance based thereon.

Other components of the mobile device 100, which may be monitored, include a clock 106 and/or third party applications 107. Times during which a particular user carries out particular functions may be indicative and dispositive that the particular user should be granted security clearance. For example, if a particular user opens a news application every morning around 7:30 AM, such behavior may be stored as part of the user's profile and may be considered a recognizable pattern indicative of the particular user of the device 100.

Additionally, fingerprint sensor 108 may also be monitored for behavioral data. Any one or more of the pressure, the center of pressure, the position of the finger of the user, and the relative motion of the finger when using a fingerprint sensor 108 may be indicative and dispositive that the particular user should be granted security clearance. For example, if a particular user always applies significant pressure when using the fingerprint sensor 108, such behavior may be stored in the user's profile and may be a recognizable pattern indicative of the particular user of the device 100. As a further example, if a particular user always swipes his finger over fingerprint sensor 108 s from the upper left to the lower right, such behavior may be stored in the user's profile and may be a recognizable pattern indicative of the particular user of the device 100. As a further example, if a particular user always holds his mobile device 100 with a 45 degree angle relative to the ground when swiping his finger over the fingerprint sensor 108, such behavior may be stored in the user's profile and may be a recognizable pattern indicative of the particular user of the device 100.

Additional components may be included in the device 100 for purposes of monitoring, recording, and/or sending behavioral data. One such component is a behavior monitor 109. The behavior monitor 109 may be incorporated into software that is installed onto the device 100. Alternatively, the behavior monitor 109 may be incorporated into the operating system 101. The behavior monitor 109 uses network connection 11 of the device 100 to send behavioral data to and receive behavioral data from a suitable server or remote location. The behavior monitor 109 may run in the background, and collect all available behavioral data.

The behavior of the user might be also gathered by including specific software into Third Party Applications 107 which allow gathering of information regarding user behavior.

In some embodiments, the behavior monitor 109 runs continuously, so that the system might provide a constant data feed. The behavior monitor 109 may use a secure element 110 for encryption, decryption, signing, and/or signature checking operations. The behavior monitor 109 is operable to use all available network capabilities of device 100 such as Global System for Mobile Communications (GSM), Bluetooth, Near Field Communication (NFC), etc., to send collected behavioral data to an authentication server 111, and is capable of receiving data from the authentication server 111. The behavioral data may be formatted using Extensible Markup Language (XML), JavaScript Object Notation (JSON) or other suitable structured data format. User information and optional reference information about the used cryptographic keys may also be formatted using XML, JSON or other suitable structured data format.

The behavior monitor 109 may also be in communication with a biometric/behavioral server 112, by which behavioral data may be analyzed and cross-referenced to a profile database 113. The profile database 113 may also be accessed remotely via network communication, and may contain personalized behavioral data for different users. The biometric/behavioral server 112 as well as the database 113 might reside on the device 100 as shown in FIG. 2, or might be accessed remotely as shown in FIG. 1.

The behavior monitor 109 is operable to interpret behavioral input by monitoring system events of the operating system 101. In order to be independent of user actions like installing software or deleting software, the behavior monitor 109 may be realized as a system service or included into the source code of the operating system 101.

The behavioral input data may be preprocessed locally by the behavior monitor 109, using appropriate filters and templates for particular behaviors. This may be carried out, for example, by decreasing the granularity of the available data sources such as the gyrostatic sensor 103 and the accelerometer 104. User touches or pressure values might be filtered to better distinguish the user behavior. Furthermore statistical data about the behavior of the user may also be gathered while the user is using the device 100.

The behavioral input data may be filtered by omitting outlier data from the behavior, or by using statistical or weighted methods, to gather data better suited for further processing. The behavioral data that is analyzed may include touch gestures, keyboard actions (dwell, flight time), and movements of the device as determined based on data captured from the gyrostatic sensor 103, the accelerometer 104, and GPS 105.

The secure element 110, which may be included on the device 100, may be used for confirming or rejecting an identity of a user. The secure element 110 might be a simple Subscriber Identity Module (SIM) Universal Integrated Circuit Card (UICC), Trusted Platform Module (TPM), NFC module or another smart card or device that is capable of storing a secret key or a private/public key pair and is able to perform cryptographic operations therewith.

The secure element 110 might be included in the device 100 or may be otherwise connected to it, such that it may be accessible via an application installed on the device 100. Such a connection between the device 100 and the secure element 110 may be carried out using several wire-bound or wireless protocols, including, but not limited to, Universal Serial Bus (USB), Bluetooth, NFC, Radio-Frequency Identification (RFID) or other suitable protocols. The secure element 110 may also comprise a secured application capable of holding a secret or private/public key pair and able to carry out cryptographic operations therewith, a combination of an application with a protected storage, or an application using a cryptographic co-processor.

The secure element 110 may contain a symmetric key or an asymmetric key pair, and a server key. Cryptographic keys may be included in the secure element 110 at production time of the secure element. Cryptographic keys may be included via a bootstrap process and may later be updated using secure means. The cryptographic keys might also be generated in the secure element 110 and authenticated, using traditional Public-Key Infrastructure (PKI) means like signed Public-Key Cryptography Standard #10 (PKCS10) and certificates.

Figure 3:
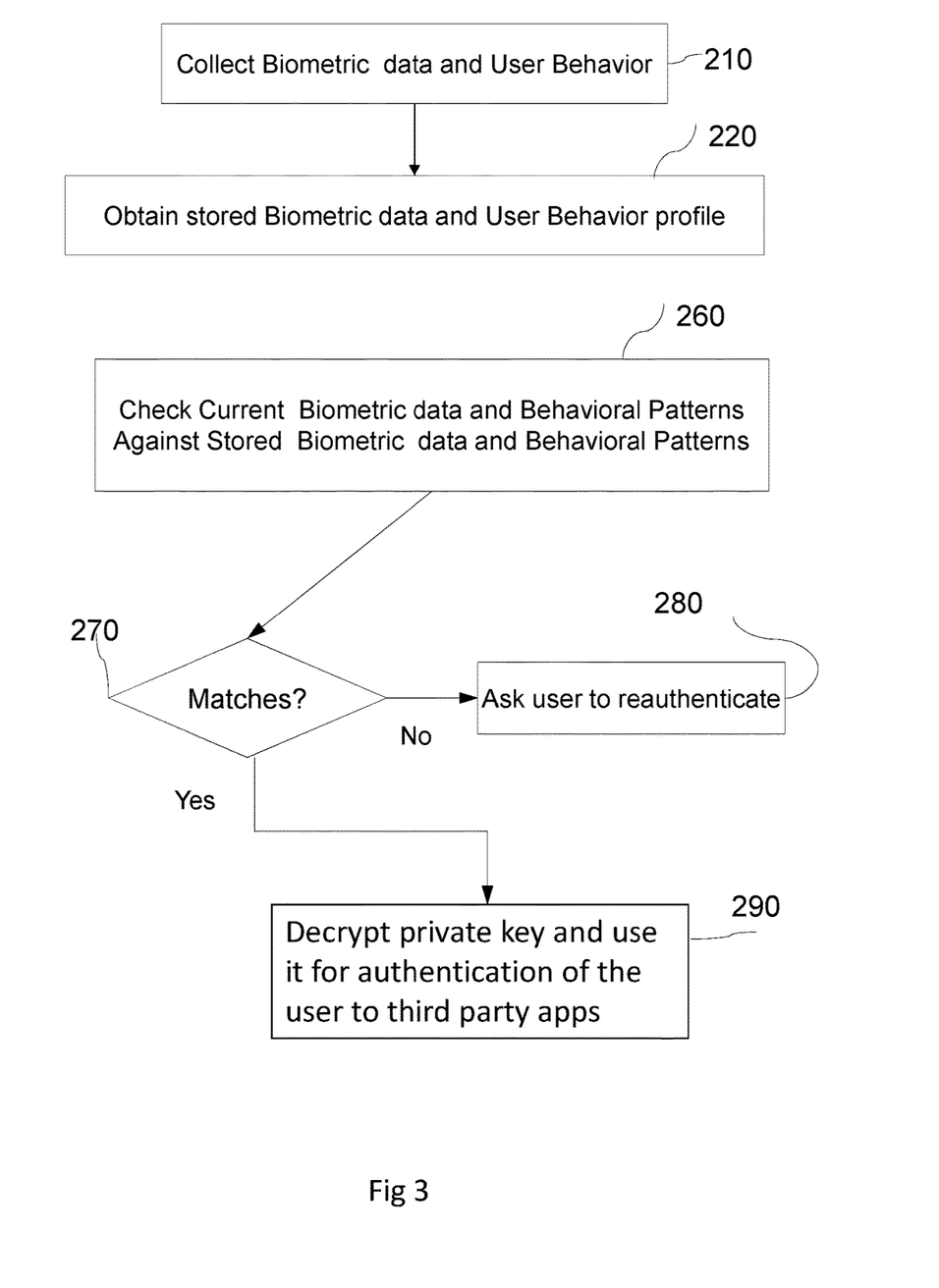
FIG. 3 shows a flow chart of steps taken in a method of authenticating a user according to an embodiment of the disclosed technology.

FIG. 3 shows a flow chart of steps taken in a method of authenticating a user according to an embodiment of the disclosed technology. In a first step 210 of the method, the behavior monitor gathers behavioral data via the device, and a biometric input device collects biometric data. The biometric and behavioral data may originate from the fingerprint sensor, the touchscreen or touchpad, the gyrostatic sensor, the accelerator, the microphone, the camera, the GPS location, or any other component of the device.

In a second step 220, stored biometric and behavioral patterns are drawn, as a user profile, from the database, based on provided user information. The behavior monitor then checks the currently collected biometric data and behavioral patterns against stored biometric and behavioral patterns at step 260.

If no match is found for the data at step 270, access to the device may be prohibited in step 280, or the user may be asked to provide additional means of authentication. Alternatively, the granularity may be adjusted to encompass a broader range of behavioral attributes until a possible match is found. The matching of the biometric and behavioral data to profiles in the database may be carried out using traditional statistic algorithms, or using other available algorithms like Support Vector Machine (SVM) or Bayes nets or any other suitable algorithms. Thresholds on the similarity of the profile and the provided biometric and behavioral information may be used to drive this decision.

If a match is found in step 270, at step 290 the private key of the user is decrypted and used for authentication against third parties, which might be carried out by signing some information or encrypting a token generating authentication information. The needed secure element keys or certificates may be generated either at production time of the secure element, or in an installation/updating phase of the secure element.

Using the authentication information, it is possible to grant access to specific features of the mobile device in step 290. The authentication information may be shared with third party applications on the device which may require security clearance. Those applications requiring security clearance may be considered "protected services" for purposes of this specification. For example, a mobile banking application may require a certain level of security clearance before granting access to certain features thereof. The access granted in step 290 may otherwise be subject to other security measures, such as, for example, the entering of a PIN, the authentication of a fingerprint, or some other biometric security measure.

Once authentication is initially confirmed, a behavioral authenticated dialogue may be started with the protected service using the authentication information provided by the behavioral monitor. Behavior pertaining to the protected service may continue to be recorded and monitored after access is granted.

If the user is rejected at step 280, information pertaining to the rejection or to reasons therefor might be shown to the user or shared with a protected service. The rejection information may then be communicated to the user of the device, informing this user that a connection to the protected service is not possible due to lack of security clearance.

In another embodiment, which may be combined with any of the previous embodiments, the device may signal to the user that the user was authenticated by the behavioral server. In still another embodiment, the behavioral server may transmit the user data and/or user information to a signature/encryption/token server together with additional authentication information pertaining to the user, such as a PIN, OTP token information, or other authentication information.

In yet another embodiment, when the user enters into a transaction, the behavior of the user during the transaction is monitored and recorded and a fingerprint recorded. The data might be forwarded to the behavioral server to check if the received behavior matches an expected behavior of the user as well as checking the fingerprint, as if the user had completed the transaction. In some cases, the behavior of entering a transaction is classified differently from browsing the Internet or entering a telephone number or PIN when creating a user profile.

In further embodiments, even minimal activity and patterns may be monitored. Such patterns may include keyboard timings, gestures, as well as Gesture User Interface (GUI) actions, and the like. As such, it may be possible to prevent so-called "replay attacks," whereby a behavior of a user is monitored and later "replayed." Such a "replay attack" may be difficult to carry out, given the extensive authentication measures required.

In another embodiment, the behavioral monitor may run in a protected environment using a secure means to monitor and record behavioral information. The behavioral monitor might prompt a user with a specific keyboard on the display to securely enter a PIN and thereby collect behavioral data. Furthermore, the behavioral monitor might use any security means available on the specific device platform to prevent tampering.

In another embodiment, user information provided by the user might include a user name, a device Identity (ID), a token, a nonce, an ID of the secure element, an ID contained in the secure element, a PIN, an OTP token, and/or any combination thereof. In another embodiment, the provided user information might include transaction data or the hash of a transaction.

In still further embodiments, the decision of the biometric and behavioral server may be based on the quality and/or the amount of data stored in a particular profile. As such, a profile with relatively little data may be more easily authenticated. Additionally or alternatively, the decision of the biometric and behavioral server may be based on the quality and/or the amount of data recorded regarding a present user. Still further, the decision of the biometric and behavioral server may be based on the behavioral data provided by the user and the requested service. Still further, the decision of the biometric and behavioral server may be based on the behavioral data provided by the user, and transaction data or the monetary value of the transaction. The authentication information may contain parts of the supplied user information.

Still further, if the behavioral server decides that the biometric and behavioral data supplied by the user does not match the biometric and behavioral profile drawn from the database, a further authentication request may be sent to an operating system. As such, the operating system may generate an additional authentication request to the user. The operating system may go even further to call the user and ask for an additional authentication, such as fingerprints, a PIN number or a personal question known only to the user. The additional authentication information provided by the user may also be compared to a user profile stored in a database, and a decision may be made based on the comparison. In a further embodiment, the operating system may override a previous decision of the biometric and behavioral server rejecting authentication of the user. In another embodiment, a call center may place a call to the user requesting authentication information such as a PIN or an answer to a security question.

With regard to unlocking of the protected service, the authentication information may be transmitted directly to the protected service. Furthermore, in the event of a rejection, the information may also be transmitted directly to the protected service. Communication with the protected service may be carried out via the device, using a communicated token or nonce. The protected service may be stored on the device, on the secured element, or may be stored on the Internet and may be accessible via a Uniform Resource Locator (URL). The protected service may merely encompass a certain action or feature of a third party application, such as, for example, a transaction authentication request.

The behavioral and biometric server might be available as a central web service, such as server 112 of FIG. 1, or may be installed locally on the device, such as server 112 of FIG. 2.

Figure 4:
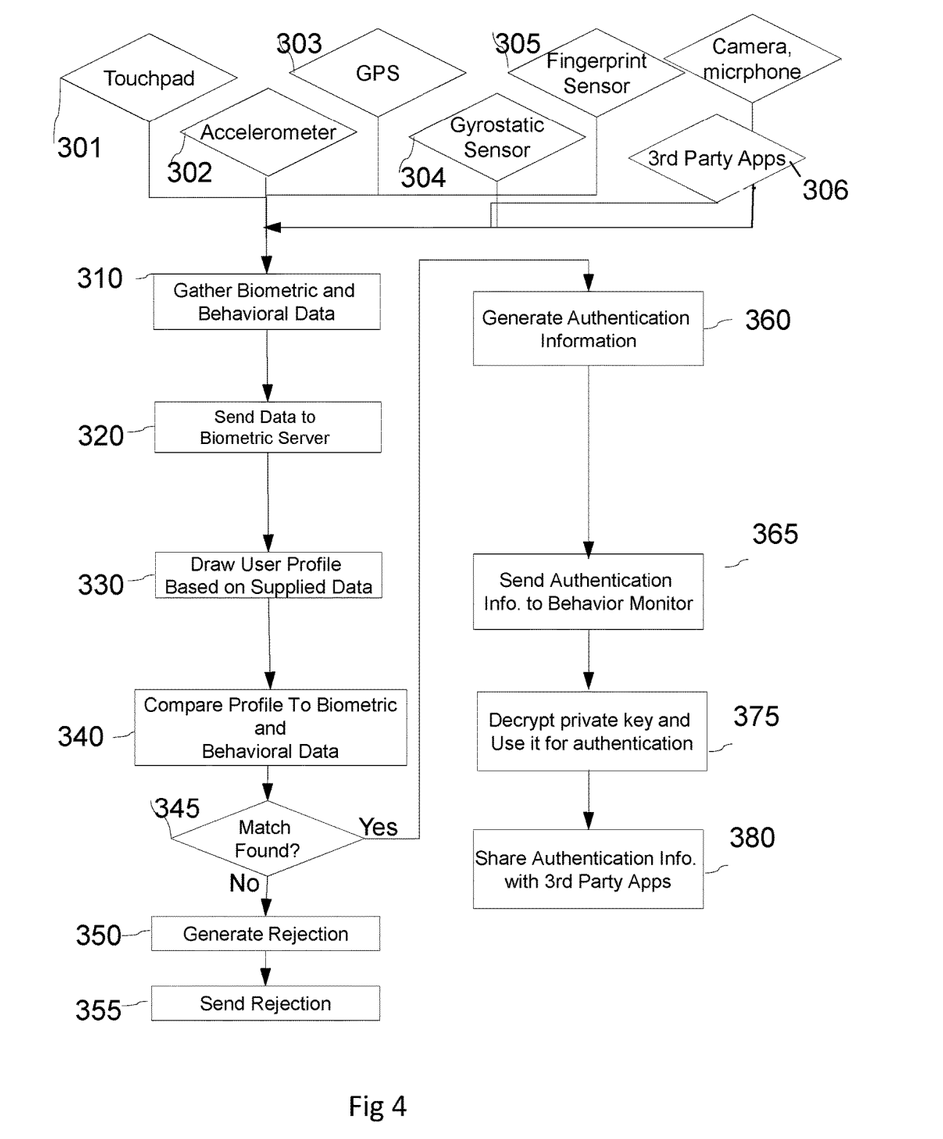
FIG. 4 shows a flow chart of steps taken in a method of authenticating a user according to another embodiment of the disclosed technology.

FIG. 4 shows a flow chart of steps taken in a method of authenticating a user according to another embodiment of the disclosed technology. In the first step 310, behavioral and biometrical data are gathered from multiple on-board components of the computing device. The data may be gathered from use of a touchpad 301, an accelerometer 302, a GPS 303, a gyrostatic sensor 304, a fingerprint sensor 305, and/or third party applications 306. The gathered behavioral data 310 may be grouped by category, and then encrypted and optionally digitally signed. Other data, such as data regarding the device, the user of the device, and the nature of the permission that is sought to be granted may also be encrypted.

Next, in step 320 the encrypted data is sent to the biometric server. The data may be sent via the device's network connection, which may be via a local area network, a packet-switch data network, or any other type of connection. Next, in step 330, the user profile is drawn from the database based on the supplied user data and/or device data.

The biometric server and the database may be remotely located (as shown in FIG. 1) or may be located on the device (as shown in FIG. 2). Once the user profile is drawn, the profile is compared to the gathered behavioral data in step 340. Next, in step 345, a determination is made as to whether the user profile matches the gathered behavioral data.

If no match is found, then the server assumes that the user cannot be trusted or is not the intended user or owner of the device. Thus, in step 350 a rejection is generated, and in step 355 the rejection is sent to the device. In the case that the biometric server is located on the device, the rejection information might be shown to the user. The rejection may inform the user why this user has been denied security clearance. Alternatively, the rejection may restrict access to a certain application, a certain feature of an application, and/or a certain feature of the device, or to a web based service.

If, on the other hand, the user profile matches the biometric and behavioral data, then authentication information is generated in step 360. The authentication information serves the purpose of communicating to the device that the user is, in fact, an authorized user, or the intended user of the device, pursuant to the user's biometric and behavioral information matching that of the drawn user profile. The authentication information is then sent to the behavior monitor in step 365. The optional digital signing of the authentication information adds an extra level of security which indicates to the device that the data being sent is secure, thus allowing the authentication information to be checked by the device or third party applications and services.

Next, in step 375, the authentication information is received by the device, and the private key of the user may be decrypted and used for generating an authentication information which might be shared with third party applications at step 380. The third party applications may use the authentication information to grant security clearance to the user with regard to certain features and actions. For example, the authentication information may grant a user access to a mobile banking application on the mobile device, the user's behavior having been authenticated. In some cases, access is also subject to traditional security measures, such as the entering of a password or PIN number.

The authentication information may alternatively be in the form of a security classification of the current user. If the biometric and behavioral data only partially match the profile data, then some level of authentication may be granted. That is, certain features of the device and/or of third party applications may be accessible if those features do not require a high level of security. For example, a user with partial authentication may be permitted to access text messages on a mobile device, but would still be restricted from accessing critical information, such as a mobile banking application. The security classification may be based on a numeric scale, such as, for example, 1 to 10, 1 being lowest level of security clearance and 10 being the highest level of security clearance. The use of security classifications may be appropriate when the gathered behavioral data does not fully or exactly match the user profile data. Such may be the case when an intended user of a device is on vacation or is following a different personal schedule than normal.

Figure 5:
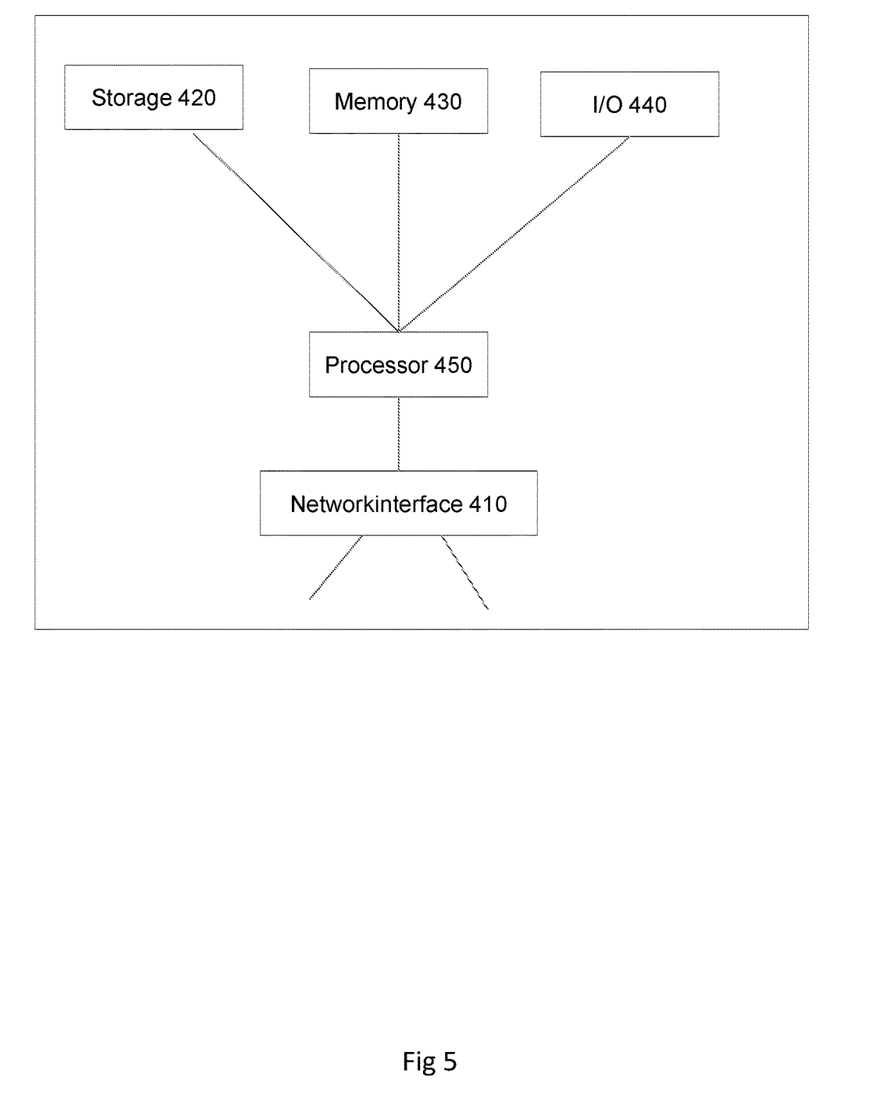
FIG. 5 shows a high level block diagram of a device that may be used to carry out the disclosed technology.

FIG. 5 shows a high-level block diagram of a mobile device that may be used to carry out the disclosed technology. Computing device 400 comprises a processor 450 that controls the overall operation of the device by executing the device's program instructions which define such operation. The device's program instructions may be stored in a storage device 420 (e.g., magnetic disk, database) and loaded into memory 430 when execution of the console's program instructions is desired. Thus, the device's operation will be defined by the device's program instructions stored in memory 430 and/or storage 420, and the console will be controlled by processor 450 executing the console's program instructions.

The device 400 also includes one or a plurality of input network interfaces for communicating with other devices via a network (e.g., packet-switched data network). The device 400 further includes an electrical input interface for receiving power and data from a power source. A device 400 also includes one or more output network interfaces 410 for communicating with other devices. Device 400 also includes input/output 440, representing devices which allow for user interaction with a computing device (e.g., touch display, keyboard, fingerprint reader etc.). One skilled in the art will recognize that an implementation of an actual device will contain other components as well, and that FIG. 5 is a high level representation of some of the components of such a device for illustrative purposes. It should also be understood by one skilled in the art that the methods, systems and/or devices depicted in FIGS. 1 through 4 may be implemented on a device such as is shown in FIG. 5.

While the disclosed invention has been taught with specific reference to the above embodiments, a person having ordinary skill in the art will recognize that changes can be made in form and detail without departing from the spirit and the scope of the disclosed invention. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed invention.

The invention claimed is:

1. A device for authenticating a user for access to protected information, the device comprising:
    at least one biometric input device obtaining biometric information from a user to be authenticated;
    at least one behavioral input device obtaining behavioral information from a user to be authenticated;
    a database; and
    a hardware processor, functionally associated with said biometric input device, said behavioral input device, and said database,
    said hardware processor:
        obtaining from said biometric input device biometric information associated with said user and generating therefrom biometric user profile;
        obtaining from said behavioral input device behavioral information associated with said user and generating therefrom a behavioral user profile;
        storing said generated biometric user profile and said behavioral user profile in said database;
        at a time of authentication, comparing a biometric user sample obtained from said biometric input device, and a behavioral user sample obtained from said behavioral input device to said biometric user profile and said behavioral user profile, respectively;
    if said biometric user sample and said behavioral user sample match said biometric user profile and said behavioral user profile generating a security classification based on a degree of correlation between said biometric user sample and said behavioral user sample to said biometric user profile and to said behavioral user profile associated with said user; wherein said security classification is a numeric scale between two integers, wherein a security clearance is determined based on said security classification, respectively, enabling said user to access to different features of said protected information based on said security clearance, wherein said generating said behavioral user profile and said obtaining said behavioral user sample comprises:
a fingerprint sensor capturing a full image of a fingerprint of said user;
said fingerprint sensor capturing at least one other, at least partial, image of said fingerprint of said user; and providing said full image of said fingerprint of said user and said at least one other image of said fingerprint of said user to said processor; and
said processor receiving and using said full image of said fingerprint of said user and said at least one other image of said fingerprint of said user, determining at least three of:
a direction in which a finger of said user was swiped over said fingerprint sensor in a fingerprint swipe;
a center of gravity of said fingerprint swipe;
a speed of said fingerprint swipe;
a position of said fingerprint swipe relative to said fingerprint sensor; and
a pressure applied by said finger of said user when swiping over said fingerprint sensor;
wherein said behavioral user profile and said behavioral user sample additionally comprise:
an angular orientation of said device including said behavioral input device during use thereof by said user provided by at least one of a gyroscope and an accelerometer;
a location of use of said device including said behavioral input device provided by a location sensor;
characteristic of network connectivity of one network to which said device is connected during use thereof;
a sequence of applications used by said user on said device; and
characteristics of times of use of said device by said user provided by a clock of said device;
wherein generating said biometric user profile and said biometric user sample comprises obtaining at least one of said fingerprint, a facial image and a voice recording of said user.

2. The device of claim 1, wherein said database is located in a network node remote to said hardware processor, said device further comprising at least one communication module for communicating at least one of said biometric user profile and said behavioral user profile to said database and for receiving communications from remote network nodes.

3. The device of claim 1, wherein said behavioral input device comprises:
a touchpad providing, as said behavioral information, information regarding use characteristics of tactile interaction therewith;
a keystroke sensor providing, as said behavioral information, information regarding at least one keystroke pattern.

4. The device of claim 1, wherein said fingerprint sensor comprises a touchpad providing to said processor, for generation of said behavioral user profile or said behavioral user sample, behavioral information including at least one of:
a pattern of finger swiping on said touchpad;
at least one gesture drawn on said touchpad;
electrical currents drawn by said fingerprint sensor; and
characteristics of user tapping on said touchpad.

5. A method for authenticating a user for access to protected information, the method comprising:
using a biometric input device and a behavioral input device, generating a biometric user profile and a behavioral user profile associated with a user to be authenticated;
storing said generated biometric user profile and said behavioral user profile in a database;
when authenticating said user, obtaining a biometric user sample using said biometric input device and a behavioral user sample using said behavioral input device;
via a communication module, functionally associated with said biometric input device and said behavioral input device, transmitting said biometric user sample and said behavioral user sample to a biometric and behavioral server;
at said biometric and behavioral server, extracting from said database said biometric user profile and said behavioral user profile, and comparing said biometric user sample and said behavioral user sample to said biometric user profile and to said behavioral user profile associated with said user, respectively; and
if said biometric user sample and said behavioral user sample match said biometric user profile and said behavioral user profile generating a security classification based on a degree of correlation between said biometric user sample and said behavioral user sample to said biometric user profile and to said behavioral user profile associated with said user; wherein said security classification is a numeric scale between two integers, wherein a security clearance is determined based on said security classification, respectively, enabling said user to access to different features of said protected information based on said security clearance;
wherein said generating said behavioral user profile and said obtaining said behavioral user sample comprises:
acquiring from a fingerprint sensor a full image of a fingerprint of said user;
obtaining from said fingerprint sensor at least one other, at least partial, image of said fingerprint of said user;
using said full image of said fingerprint of said user and said at least one other image of said fingerprint of said user, determining at least three of:
a direction in which a finger of said user was swiped over said fingerprint sensor in a fingerprint swipe;
a center of gravity of said fingerprint swipe;
a speed of said fingerprint swipe;
a position of said fingerprint swipe relative to said fingerprint sensor; and
a pressure applied by said finger of said user when swiping over said fingerprint sensor;
wherein said behavioral user profile and said behavioral user sample additionally comprise:
an angular orientation of said device including said behavioral input device during use thereof by said user;
a location of use of said device including said behavioral input device;
characteristic of network connectivity of one network to which said device is connected during use thereof;
a sequence of applications used by said user on said device; and
characteristics of times of use of said device by said user;
wherein generating said biometric user profile and said biometric user sample comprises obtaining at least one of said fingerprint, a facial image and a voice recording of said user.

6. The method of claim 5, wherein said fingerprint sensor comprises a touchpad, and said determining additionally comprises determining at least one of:
 a pattern of finger swiping on said touchpad;
 at least one gesture drawn on said touchpad;
 electrical currents drawn by said fingerprint sensor; and
 characteristics of user tapping on said touchpad.

7. The method of claim 5, wherein said behavioral user profile and said behavioral user sample additionally comprises:
 at least one keystroke pattern.

\* \* \* \* \*